United States Patent [19]

Maack et al.

[11] Patent Number: 4,730,596
[45] Date of Patent: Mar. 15, 1988

[54] ROLL-TYPE DRESSING UNIT

[75] Inventors: Horst E. Maack; Manfred M. Funke, both of Cincinnati, Ohio

[73] Assignee: Cincinnati Milacron Inc., Cincinnati, Ohio

[21] Appl. No.: 915,461

[22] Filed: Oct. 6, 1986

[51] Int. Cl.[4] .......................... B24B 53/14; F16C 7/04
[52] U.S. Cl. .............................. 125/11 CD; 384/113; 51/168
[58] Field of Search ............................ 51/134.5 F, 168; 125/11 CD; 384/114, 115, 113, 316

[56] References Cited

U.S. PATENT DOCUMENTS

| | | | |
|---|---|---|---|
| 3,107,129 | 10/1963 | Brown | 384/114 |
| 3,374,039 | 3/1968 | Voorhies | 384/114 |
| 3,383,805 | 5/1968 | Powell | 51/134.5 F |
| 3,387,899 | 6/1968 | Hahn | 384/316 |
| 3,560,062 | 2/1971 | Kun | 384/115 |
| 4,206,953 | 6/1980 | Diehl | 384/113 |
| 4,330,962 | 5/1982 | Favrot | 125/11 CD |

FOREIGN PATENT DOCUMENTS 721549 1/1955 United Kingdom ................ 384/114

*Primary Examiner*—Harold D. Whitehead
*Attorney, Agent, or Firm*—Thomas M. Farrell

[57] ABSTRACT

A dressing roll unit is supported on a nonrotating shaft clamped and maintained as a "fixed end" beam, thereby restrained against axial movement and deflection. The shaft is formed with spaced-apart bearing points, wherein wedge-shaped relief sectors are formed about the shaft at the bearing points, and a roll body is maintained about the bearing points with an annular clearance. Rotation of the dressing roll body and roll thereby forms high pressure hydrodynamic wedges of oil at the relief sectors and annular clearances, to create an extremely rigid roll mounting unit, without the need for pivoting bearing parts.

1 Claim, 4 Drawing Figures

ROLL-TYPE DRESSING UNIT

BACKGROUND OF THE INVENTION

The inventions relates generally to grinding machines employing a dressing roll unit for conditioning the grinding wheel.

In particular, the invention concerns itself with roll-type dressing units wherein the roll is of the powered type, i.e. the roll has its own motorized assembly for imparting rotational motion to the roll before and during contact with the grinding wheel. Such dressing units are well-known in the grinding arts and are expensive and difficult to make, particularly for wide dressing paths. Of important consideration is a centerless grinding machine, where grinding wheels can typically be, up to 24 inches wide. In conditioning a wheel of this width, a comparable length dressing roll must be employed, and, the main portion of roll support is obtained at or near the ends. In all cases, the roll must rotate. However, in certain assemblies the roll is attached to a shaft which is rotated in bearings at its ends, typically ball bearing sets. In such mounting stance, the shaft behaves as if it were a "simply supported" beam, assuming a classical deflection curve through what may be indicated as "points" of suspension at its ends.

In one prior art assembly, U.S. Pat. No. 4,206,953, the dressing roll in a wide wheel dressing unit is generally tubular, and is supported on a nonrotating shaft. The shaft is held at its ends in a dressing unit housing, and the rotational support bearings comprise a plurality of pockets machined in the outer surface of bushings located on the shaft. The pockets are supplied with high pressure oil which, in typical hydrostatic bearing fashion, is supplied through a series of restrictors to each pocket. Thus, the classical hydrostatic bearing is achieved, which is self-compensating for deflection around the pocket areas. The truing assembly of the prior art suffers from several infirmities including the necessity of supplying high pressure oil or other fluid to the bearing area and attendant pump requirements and leakage potential; the necessity of utilizing a restrictor, such as an orifice or choke coil, which may become clogged and unable to function properly; and the fact that the nonrotating shaft has relatively small end diameters and is, apparently, slid into the housing bores and locked in position. This style of assembly for the shaft does not provide the maximum stiffness.

In contrast, applicants have obviated the difficulties inherent in the prior art devices by their design of a roll-type dressing unit, in which a relatively stationary casting is provided with very thick walls to support the shafts, and the shaft spanning the two walls is tightly clamped and thus approaching what is classically described as a "fixed end" beam -- that is, one having a very shallow deflection curve across its length when compared with a "simple-supported" beam. Further, applicants have designed a hydrodynamic bearing system directly into the shaft at spaced-apart points, that is, where the roll body is created with accurately bored end bushings and the bushings form an annular space around the hydrodynamic bearing points. A plurality of wedge-like reliefs are formed into the shaft surface, all going in the same direction. Low pressure oil is flowed through the roll body and, during high rotational speed of the roll a hydrodynamic wedge of oil will be driven into the wedge formations, creating an extremely stiff bearing system which, when coupled with the "fixed end" beam support system, creates an overall system of enhanced rigidity without the need for loose, pivoting bearing parts found in prior art hydrodynamic bearings.

It is therefore an object of the present invention to provide a roll-type dressing unit having an extremely stiff roll support system.

SUMMARY OF THE INVENTION

The invention is shown embodied in a grinding machine having a power dressing roll and means for moving the dressing assembly toward, and from, a grinding wheel. An improved dressing roll mounting unit provided in the dressing assembly comprises a rigid housing with substantially thick opposed walls having a pair of in-line bores through the walls; a dressing roll body is positioned between the walls, the roll body having a bearing bore in line with said pair of in-line bores; a roll support shaft extends through the roll body and the pair of in-line bores, where cylindrical opposite end portions of the shaft are securely fixed in the in-line bores of the dressing housing; spaced apart bearing sections are maintained on a cylindrical middle portion of the shaft, each bearing section comprising relief sectors formed in the cylindrical surface of the shaft at equal spacings around the circumference of the shaft, the relief sectors being of generally wedge-shaped cross-section, extending in the same circumferential direction; a fluid medium is maintained in the relief sectors, and also in an annular space formed around the relief sectors by the roll body bore; means is provided for rotatably driving the roll body about the shaft whereby said relief sectors may establish a wedge of fluid coacting with said annular space to create a hydrodynamic pressure as said roll body is rotated.

DESCRIPTION OF THE PREFERRED EMBODIMENT

Figure 1:
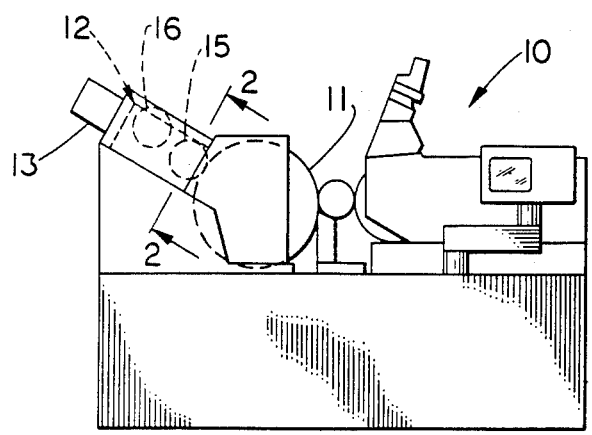
FIG. 1 is a front view of a centerless grinder and wheel dressing unit.

FIG. 1 is a front view of an exemplary centerless grinding machine 10, having a relatively wide wheel 11, typically in the range of approximately 24 inches (609.5 mm). It will be appreciated that the wheel may be replaced with other wheel mounts (not shown) which may include narrow, spaced-apart wheels. The grinding machine 10 has a wheel dressing unit 12 mounted with means 13 for advancing the unit 12 toward, and retracting the unit from, the grinding wheel 11. The front portion of the dressing unit 12 carries a roll mounting unit 14 (see also FIG. 2), having a motorized dressing roll 15 of suitable length for dressing the entire width of the grinding wheel 11. The roll mounting unit 14 has a motor 16, driving through a belt and pulley system 17 to a roll mounting body 18 which rotates about a fixed shaft 19. The roll mounting unit 14 is comprised generally of a dressing unit base or housing 20, having a pair of spaced apart substantially thick opposed walls 21,22, chosen in the present case to approximate the diameter of the shaft 19 to be clamped therebetween. The walls 21,22 have shaft retaining caps 23 (see FIG. 4) which surround half of the shaft diameter, so that the unit may be assembled and disassembled easily, and the shaft end sections 24,25 may be tightly clamped to restrain the shaft 19 from deflection and axial movement. In the preferred embodiment, the shaft ends are relatively large, compared to the bearing.

Figure 3:
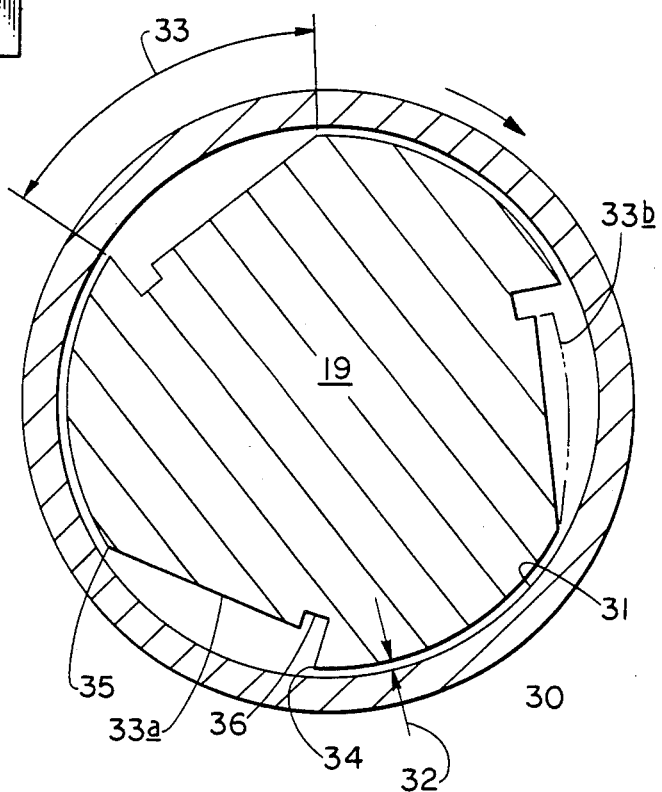
FIG. 3 is a section through a hydrodynamic bearing, taken along the line 3—3 of FIG. 2.
Figure 2:
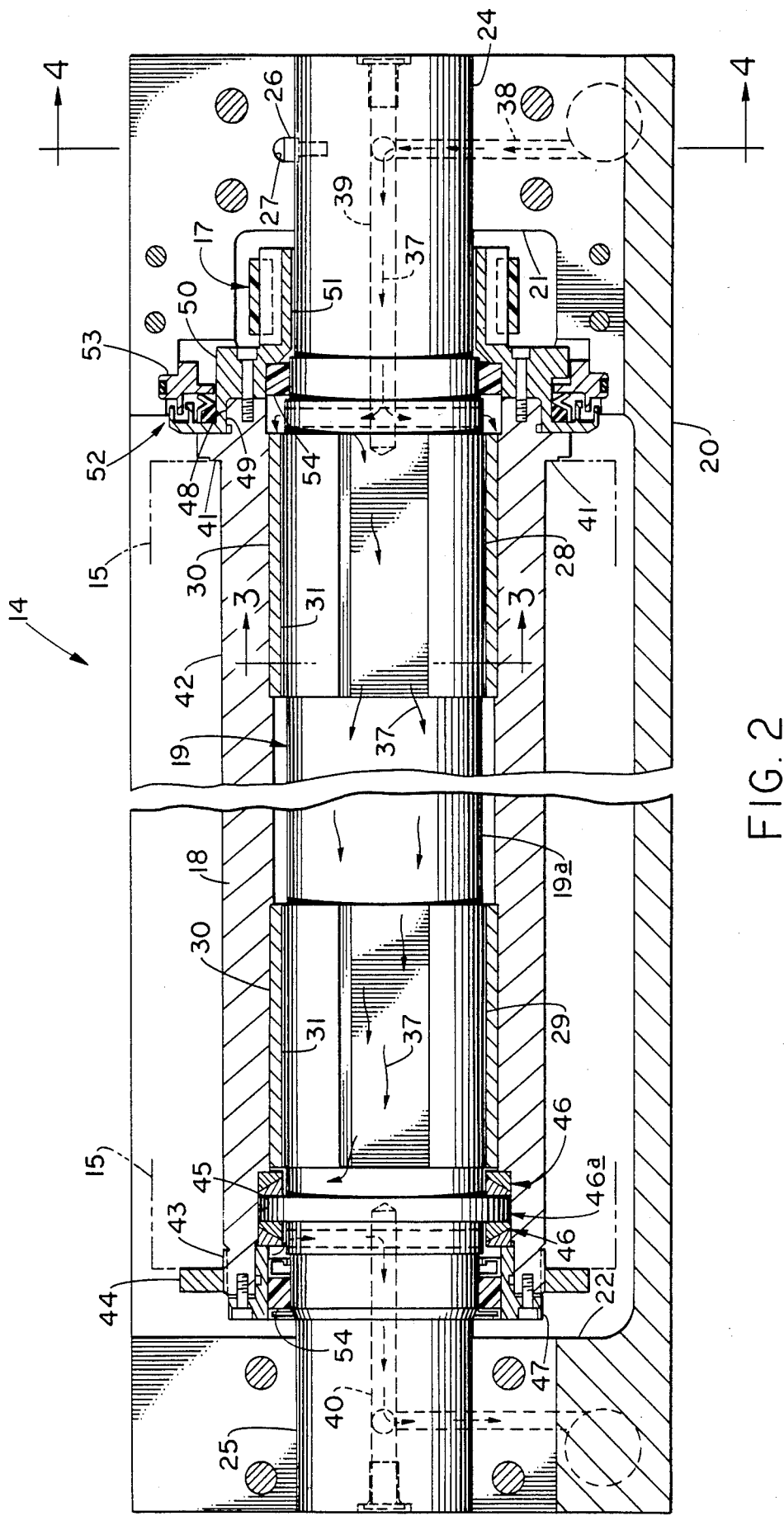
FIG. 2 is an elevational section through a dressing roll unit, taken along the line 2—2 of FIG. 1.

Referring to FIG. 2, the dressing housing 20 is shown supporting the shaft 19 as a "fixed end" beam, wherein the shaft 19 is positioned endwise, by a screw 26 received in the shaft 19 and the head of the screw is received in a slot 27 in the housing wall 21. The shaft 19 has accurate, spaced-apart cylindrical end sections 24,25, and a pair of spaced-apart cylindrical identical bearing sections 28,29 upon which the roll body 18 is positioned. The bearing sections 28,29 are received in circular bushings 30, seated within the roll body 18, and the bores 31 of the bushings 30 are dimensioned to maintain a slight annular clearance 32 (FIG. 3) around the bearing sections 28,29 of the shaft 19. The shaft 19 has a middle portion 19a, having a diameter slightly smaller than that of the bearing sections 28,29. The enlarged section through the bearing section 28 (FIG. 3), shows that plurality of (exaggerated) generally wedge-shaped relief sectors 33 are formed around the perimeter of the shaft 19, the relief sectors 33 starting at a full depth at the beginning 34 and blending gradually to the annular clearance at the end 35 of the sector 33. The bottom of the section 33 may be a flat ramped surface 33a, arcuate surface 33b, or a combination of the two. In the preferred embodiment, a small, axial, slot 36 is machined along the sector 33 at the beginning 34, to assist in the flow of hydraulic oil 37 which is brought through interdrilling 38,39 in the dressing housing 20 and the shaft 19, to the bearing sections 28,29. The oil 37 is brought in at a low pressure of, approximately 20 psi., (1.41 kg/cm$^2$) and flows through the entire bearing assembly to the opposite end where the oil 37 exits through similar interdrilling 40, carrying with it heat.

As depicted in FIG. 2, the roll body 18 is generally cylindrical, with a flange 41 at one end, and a roll mounting diameter 42 adjacent the flange 41. A threaded end 43 on the diameter 42 receives a flange nut 44 for clamping a roll 15 onto the body 18. At the threaded end 43, an accurate counterbore 45 is provided, into which is placed a pair of bronze thrust bearing assemblies 46 well-known in hydraulic spindle bearing art, comprising mated spherical bearing elements coacting against a stationary flange 46a formed on the shaft 19. The thrust bearing assembly 46 is maintained in position in the counterbore 45 by a bearing retention cap 47 fastened to the end of the roll body 18. The flange 41 of the roll body 18 has a pilot diameter 48 extending into the counterbore 49 of a timing pulley 50, and the pulley 50 is formed with a clearance bore 51 around the shaft end section 24.

The pulley 50 forms a labyrinth seal 52 with a stationary ring 53, and the ring 53 is secured in the housing 20 by a half cap (not shown), similar to the shaft retaining cap 23. The bearing retention cap 47 and pulley 50 are fitted with suitable seals 54 coacting with the shaft 19.

In assembly, therefore, the shaft 19 is rigidly maintained as a "fixed end" beam, having a very shallow deflection curve, and as the roll body 18 is rotated by the drive motor 16, an extremely high pressure wedge of film is formed at the bearing sites, creating an extremely stiff dressing roll support system.

Figure 4:
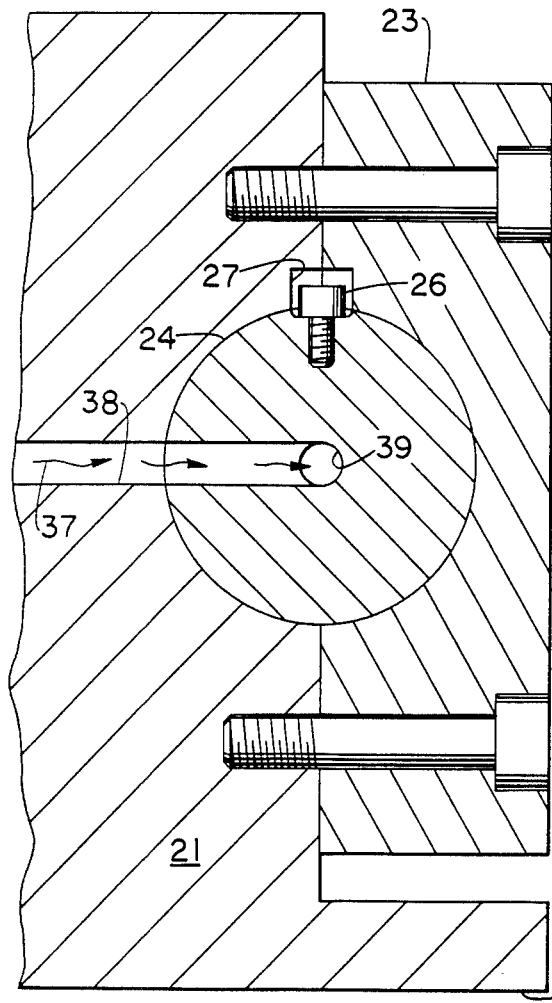
FIG. 4 is a section through a roll end support, taken along the line 4—4 of FIG. 2.

The sectional view of FIG. 4 shows the retaining method used for supporting the shaft and the interdrilling for providing fluid flow to the bearing points.

While the invention has been shown in connection with a preferred embodiment, it is not intended that the invention be so limited. Rather, the invention extends to all such designs and modifications as come within the scope of appended claims.

What is claimed is:

1. In a grinding machine, including: a base; a rotatable grinding wheel supported by said base; a wheel dressing assembly including a powered dressing roll; and means for moving the dressing assembly and said grinding wheel relatively towards each other, an improved dressing roll mounting unit, comprising:
   (a) a substantially rigid dressing housing, having
      a pair of substantially thick opposed walls, each wall including shaft-clamping means, with
      a pair of in-line bores through said walls and shaft-clamping means;
   (b) a dressing roll body positioned between said walls, said roll body having a bearing bore generally in line with said pair of in-line bores;
   (c) a roll support shaft extending through said roll body and said pair of in-line bores, said shaft comprising at least:
      a pair of cylindrical opposite-end portions securely affixed to said opposed walls by clamping said opposite-end portions in said pair of in-line bores for substantially the entire length of said opposite-end portions; and
      a cylindrical middle portion joining said end portions;
   (d) an annular space defined about said cylindrical middle portion of said shaft by said roll body bearing bore;
   (e) a pair of spaced-apart bearing sections on said cylindrical middle portion of said shaft, corresponding to said bearing bore, each of said bearing sections comprising:
      a plurality of relief sectors formed in the cylindrical surface of said shaft, at equal spacings around the circumferences thereof, said relief sectors being of generally wedge-shaped cross-section, extending in the same circumferential direction, said relief sectors being formed of
      constant width along the axis of said shaft, and formed to
      full depth at the beginning of said sector thereafter
      blending gradually to said shaft cylindrical surface at the end of said sector;
   (f) a fluid medium maintained in said annular space and said relief sectors; and
   (g) means for rotatably driving said roll body about said shaft
      whereby said relief sectors establish a wedge of fluid coacting with said annular space to create a hydrodynamic pressure as said roll body is rotated.

* * * * *